July 28, 1936.  G. CLAUSING  2,049,106
MODEL COPYING MACHINE
Filed July 22, 1935   6 Sheets-Sheet 1

INVENTOR.
George Clausing
BY C. B. Stevens
ATTORNEY.

July 28, 1936.    G. CLAUSING    2,049,106
MODEL COPYING MACHINE
Filed July 22, 1935    6 Sheets-Sheet 2

INVENTOR.
George Clausing
BY C.B.Stevens
ATTORNEY.

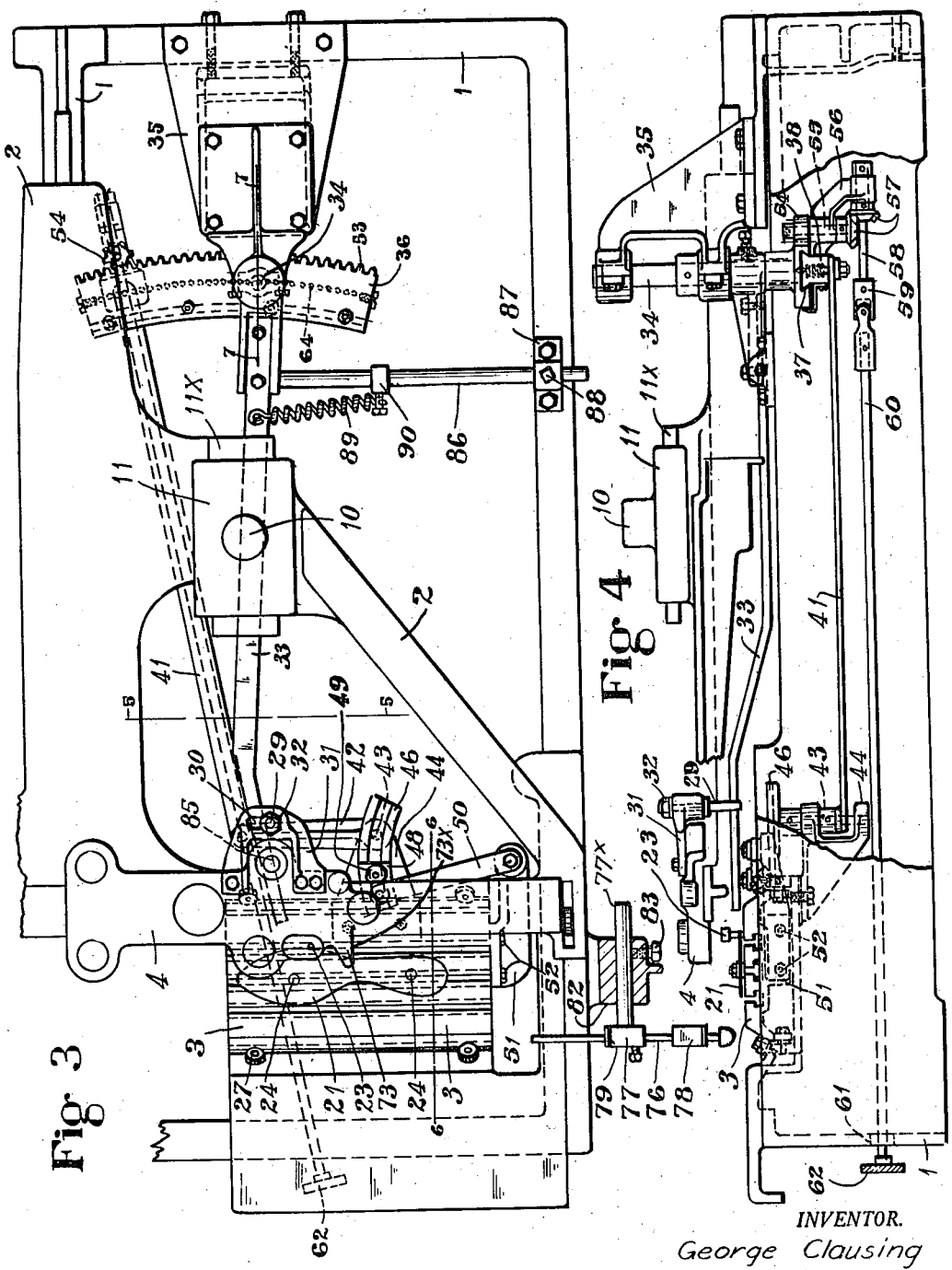

July 28, 1936.  G. CLAUSING  2,049,106
MODEL COPYING MACHINE
Filed July 22, 1935   6 Sheets-Sheet 4
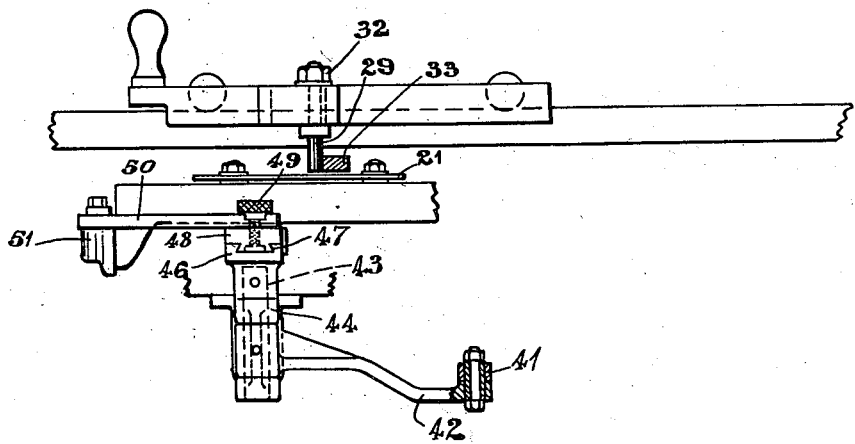
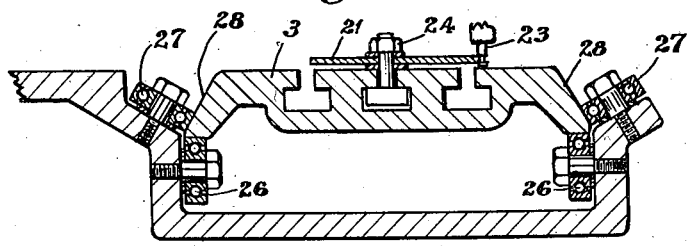
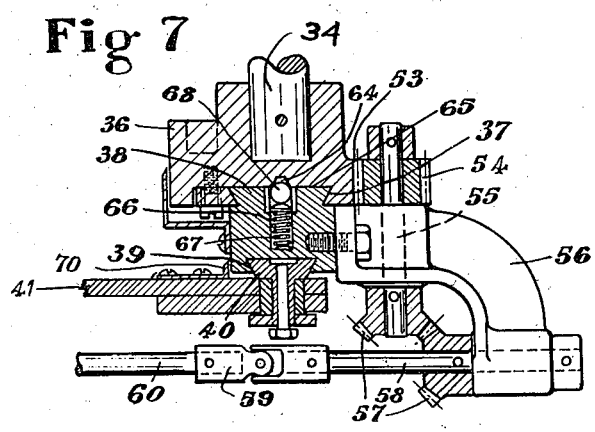
INVENTOR.
George Clausing
BY
ATTORNEY.

July 28, 1936.  G. CLAUSING  2,049,106
MODEL COPYING MACHINE
Filed July 22, 1935  6 Sheets-Sheet 5
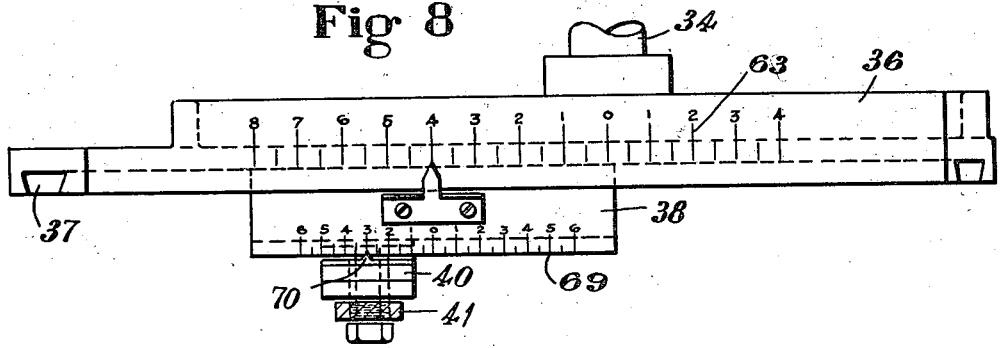
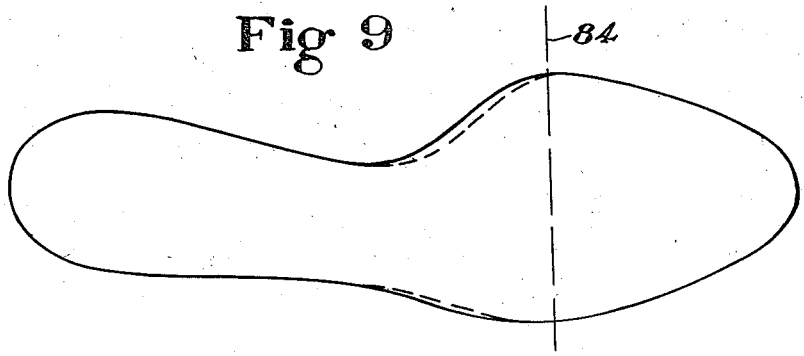
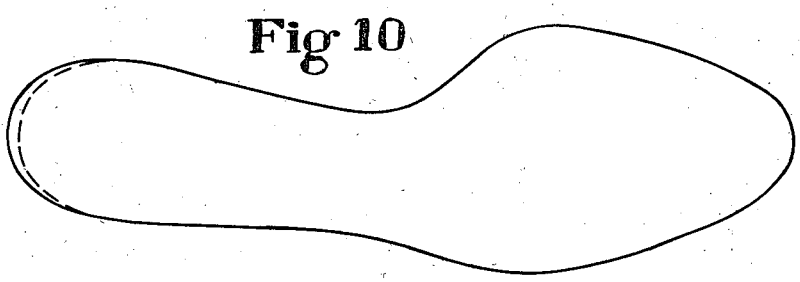
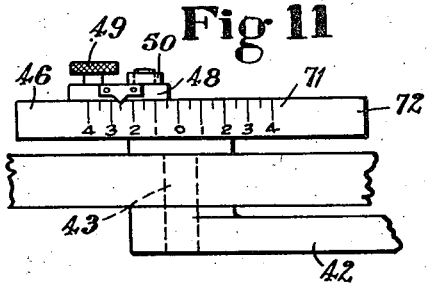
INVENTOR.
George Clausing
BY C. B. Stevens
ATTORNEY.

July 28, 1936.    G. CLAUSING    2,049,106
MODEL COPYING MACHINE
Filed July 22, 1935    6 Sheets-Sheet 6
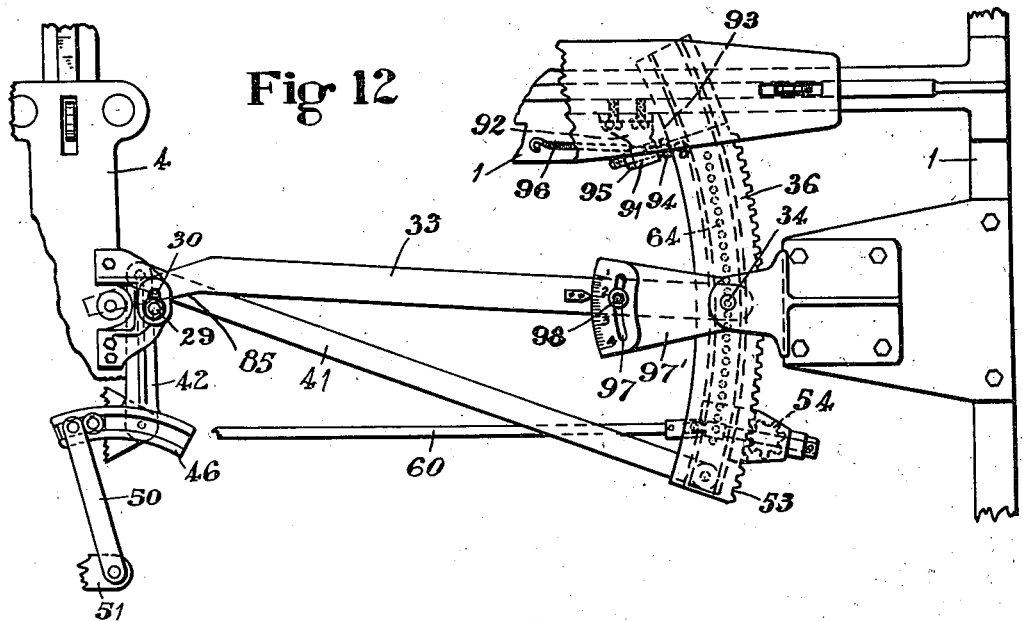
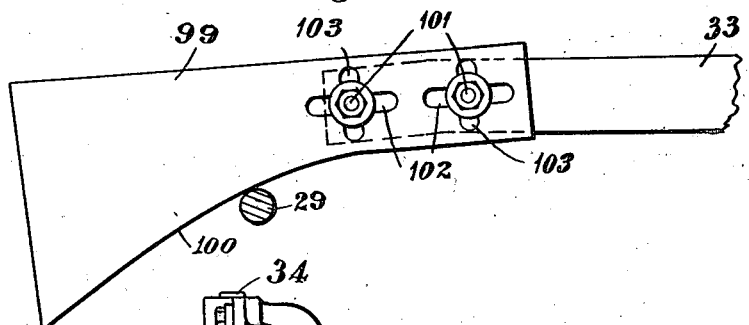
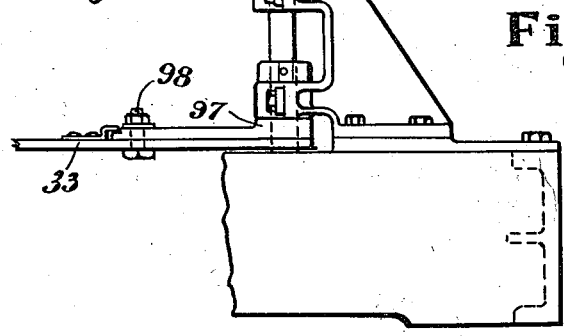
INVENTOR.
George Clausing
BY
ATTORNEY.

Patented July 28, 1936

2,049,106

UNITED STATES PATENT OFFICE 2,049,106

MODEL COPYING MACHINE

George Clausing, Portsmouth, Ohio, assignor to Vulcan Corporation, Portsmouth, Ohio Application July 22, 1935, Serial No. 32,482

20 Claims. (Cl. 164—48)

This invention relates to method and apparatus for the production of geometric patterns which are graded pantographically from a single model pattern of a given size in producing the same pattern in a series of sizes and particularly to attachments for such apparatus which act to modify the direct proportional characteristic of the pantographic means incorporated therein.

An object of the invention is to provide an attachment for such machines which acts to change the normal grading factors thereof automatically during the grading operation and permit the operator to complete a desired correct pattern or copy without stopping the machine to effect adjustment of the pantographic means.

A further object of the invention is to provide a grade changing attachment for model copying pattern grading machines which becomes active throughout a selected portion of the travel of the tracer about the model pattern and which automatically becomes inactive throughout the remainder of the tracing operation, the normal grading factors being in effect when the attachment is inactive.

A further object of the invention is to provide an attachment for changing the normal direct proportional or ratio characteristic of the pantographic means in such a manner that patterns of geometrical objects produced thereby may conform to a particular requirement such as the style contour in the fore part of a shoe pattern or last while the remaining portion of the pattern, for example, the heel or back part thereof may be made to conform with a requirement which differs from that of the requirement for the fore part, for instance, the heel part may be made to conform to standard length dimensions such as those required to produce a correct fit in a shoe produced from the pattern or upon the last while the dimensions of the fore part vary from standard while, at the same time, the size patterns vary one from the other by a length constant.

A further object of the invention is to provide an attachment of the above indicated character which is of simple design, durable in construction and consistently accurate in its operation.

A further object of the invention is to provide an attachment of the above indicated character which makes it possible to preselect the degree of modification of the pattern made from the model and proportion this preselected degree of modification according to patterns graded in sizes.

A further object of the invention is to provide a grade changing attachment for model copying machines operable to add to or subtract from the length of a selected part of a shoe pattern model, or other object, without changing the standard grading characteristic of the machine while it is grading the remaining part of the pattern.

Other objects and features will more fully appear in the following specification in connection with the accompanying drawings and will be particularly pointed out in the claims.

Fig. 3 is a plan view showing a part of the embodiment of the invention applied to a pattern grading machine, and showing a model pattern in position.

Fig. 4 is a side elevation of the elements shown in Fig. 3.

Fig. 5 is a view taken on line 5—5, Fig. 3.

Fig. 6 is a sectional view taken on line 6—6, Fig. 3.

Fig. 7 is a view, partly in section and partly in elevation, taken on line 7—7, Fig. 3.

Fig. 8 is a front elevation of one of the segments illustrating the scale markings thereon.

Fig. 9 is a diagrammatic view illustrating the corrective feature of the invention as applied to a last bottom pattern.

Fig. 10 is a diagrammatic view similar to Fig. 9 illustrating another correction which may be made by the use of the attachment.

Fig. 11 is a side elevation of another of the segments illustrating the scale markings thereon employed for determining the position of a block slidable therein.

Fig. 12 is a plan view of a portion of the apparatus illustrating a modified form thereof.

Fig. 13 is a modified form of the invention showing an adjustable cam member for controlling the action of the attachment.

Fig. 14 is a detailed view showing the construction of a portion of the elements shown in Fig. 12.

Figure 1:
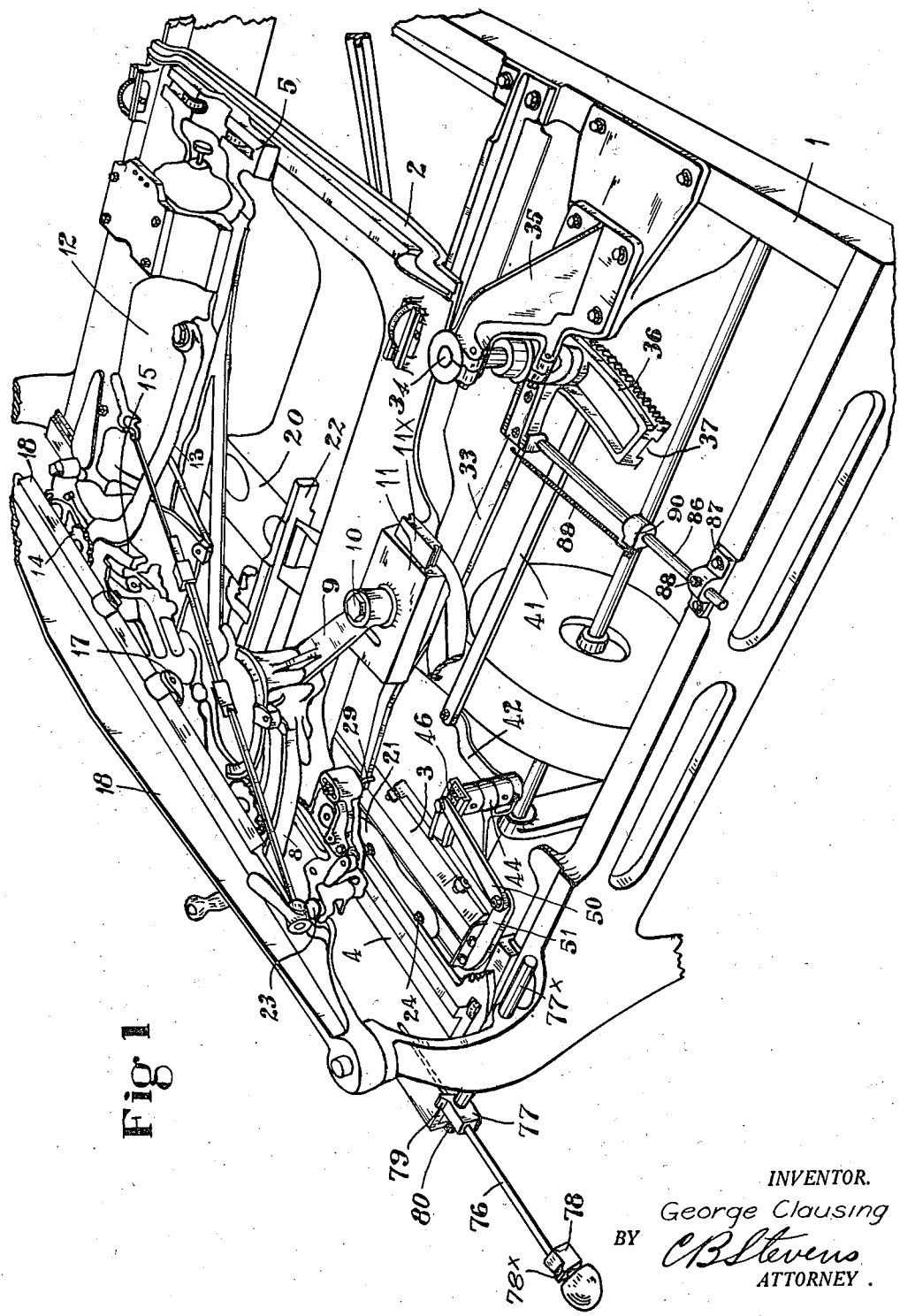
Fig. 1 is a perspective view of a grading machine embodying the principles of the invention.

An important use of the invention is in the production of patterns for shoes and lasts, the patterns being graded to different sizes to correspond to different shoe and last sizes. The broad principles of the invention, however, permit of its use in other arts wherein patterns of any nature are produced in a desired series of sizes from a model of given size. For convenience, the following description will be confined to the application of the principles of the invention to the production of insole and outsole patterns for shoes and lasts.

Shoe lasts and shoes are made up of two parts, as termed in the trade, to-wit, the toe part which extends from the center of the ball of the shoe or last forwardly, and the back part which extends from the center of the ball rearwardly. In designing footwear, frequent changes in style necessitate corresponding changes in the contour of the shoe lasts on which the shoes are made. This condition is especially true in the production of women's footwear, and the style change in the last usually takes place wholly in the fore part. The requirement in the back part is ordinarily simply that it be of proper length and width to produce a correct fit upon a normal foot.

It has been found that the direct proportional characteristic of a standard shoe or last pattern grading mechanism is capable of correctly proportioning the over all length of each pattern in a series of sizes, but that there are certain modifications in patterns that it is desirable to bring about which cannot be obtained upon such standard grading mechanism without manual adjustment of the mechanism during grading of any subsequent pattern. Let it be assumed that the designer has produced a model having an unusually long fore part causing the model to be excessively long in its over all dimension as compared to the usual model. The back part of this model, and in fact, of every model produced by the designer, is proportioned according to dimensions which produce the correct fit upon a normal foot. While this unusually long toed model is properly designed in the model size, which usually is a 4B, it is found that the sizes larger and smaller than the model size, when graded upon a standard grading mechanism without manual readjustment during such grading, do not have the proper proportionate dimensions to produce a correctly fitting shoe.

In producing graded size patterns, say up to size 10B from a size 4B model, from this model which is unusually long, due to the combination of a standard back part and an unusually long fore part, on a grading machine as is now in use, it is found that the fore and back parts of size patterns produced from the model have dimensions which are in direct proportion to the over-all length of the model pattern. That is, the unusual length of the fore part is not confined only to the fore part in the size patterns produced from the model pattern but is distributed between the fore and back parts of the pattern which takes the back part out of the range of standard dimensions specified therefor. Under these conditions, the back part of the size patterns produced from the model pattern are undesirably short due to the extra length of the fore part of the model pattern. Reversely, if the fore part of the model pattern were unusually short, the back parts of the size patterns produced therefrom would be found to be too long.

The present invention provides means for placing under the control of the operator, a device for selectively proportioning the dimensions of the back part and the fore part from one pattern size to another, and in this manner make it possible to produce a correct series of size patterns, with the back part of standard dimensions, and independently of the shape of the fore part of the model, by taking into consideration the abnormal length or reduction in length of the fore part in a particular model and compensating for such abnormal length of the fore part during the size grading operation.

Figure 2:
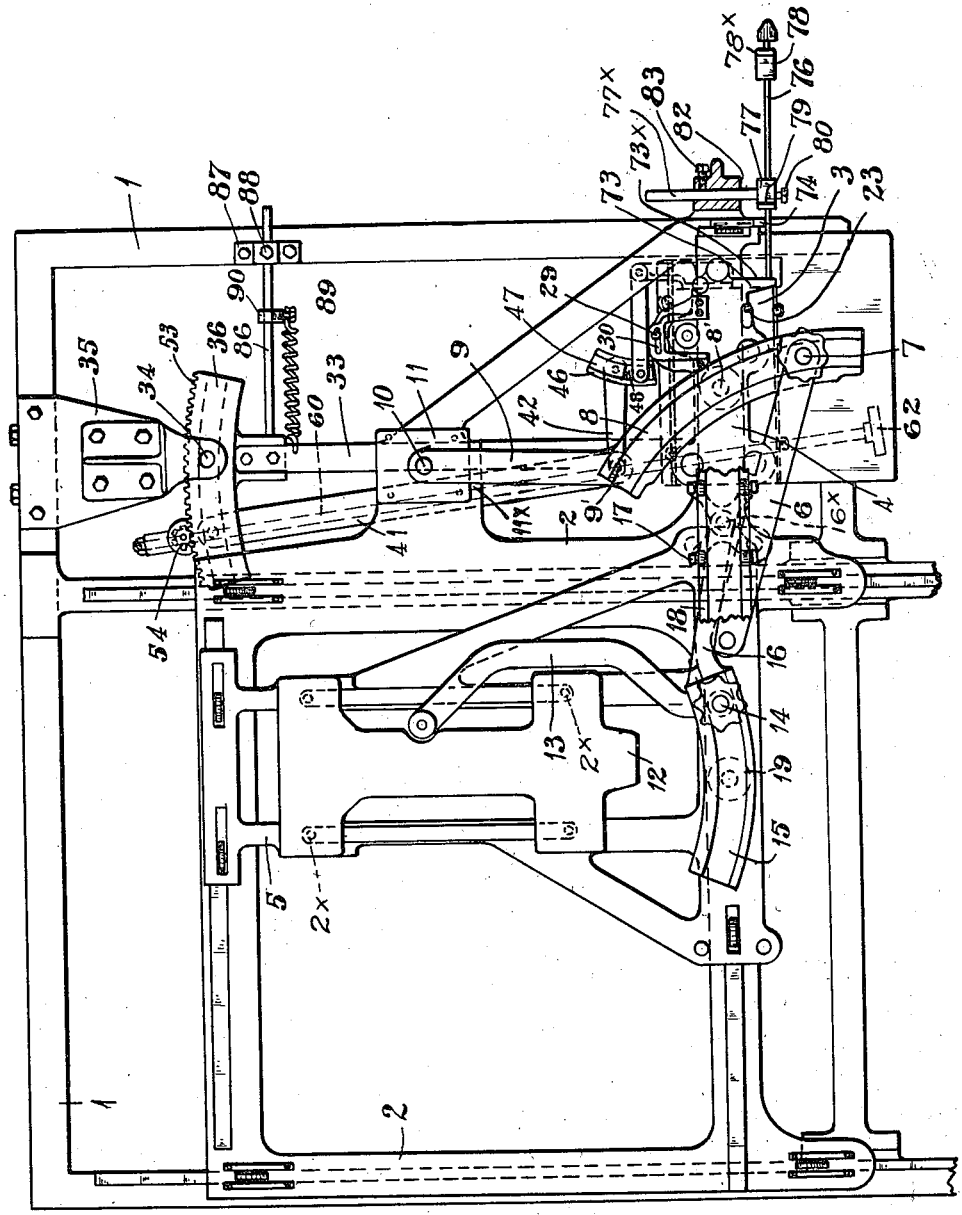
Fig. 2 is a plan view of the apparatus embodying the invention.

The specific embodiment of the invention to be described is applied to a pattern grading machine of a construction having a main frame 1 upon which is mounted a main carriage 2 movable in a linear path forwardly and backwardly as shown in Fig. 2 or toward and from the operator as he stands in front of the model table 3. Upon the carriage 2 is mounted a tracer carriage 4 which is movable along the carriage 2 in a linear path at right angles to the motion of the carriage 2, or to the right and left as shown in Fig. 2.

The carriage 4 is connected to a tool carrying carriage 5 which is also mounted upon the carriage 2 to move in a linear path upon the carriage and in the same direction as the movement of the tracer carriage 4. The carriage 4 is connected to the carriage 5 by means of a link 6 which is pivotally secured at one end to the carriage 5 and at its other end pivotally connected to the carriage 4 upon a fulcrum point 7 adjustable along a segment 8. The segment 8 is pivoted on the carriage 4 as at 8' and constitutes the outer end of a pantographic lever 9. The lever 9 is pivotally connected as at 10 to a block 11 which is slidably mounted upon a track 11X integral with the carriage 2. By adjusting the fulcrum point 7 along the segment 8 to one side or the other of the segment pivot point 8', the motion of the carriage 4, to the right or left as shown in Fig. 2, and as transmitted to the carriage 5, is increased in proportion to the adjustment of the fulcrum of the lever 6 toward the outer or free end of the segment, or decreased in proportion to the adjustment of the fulcrum point 7 toward the inner end of the lever upon the opposite side of the pivot point 8', the segment 8 being rotated about its pivot as the carriage 4 is moved.

The carriage 5 has mounted thereon a motor driven tool 12 movable in a direction parallel to the motion of the carriage 2 and transversely to the motion of the carriage 5 on ball-like members 2X (Fig. 2). The tool 12 is connected to a segment 15 by means of the link 13 which is pivotally connected at one end to the tool and connected at its other end to an adjustable fulcrum point 14 movable along the segment 15 which is pivoted on the carriage 5 at 19 and which constitutes the outer end of a pantographic lever 16 which is pivoted at its outer end to the segment 15 and at its inner end to a movable fulcrum block 17 as at 16' (see Fig. 2). The fulcrum block 17 is movable along a track 18 suspended above and secured rigidly to the main frame 1. Motion of the carriage 2 toward the front or rear of the machine is transmitted to the tool 12 through the lever 16 and the link 13, and motion of the tool forwardly and backwardly as the carriage 4 is moved to right or left may be greater or less than the motion of the carriage 2 depending upon the position of the fulcrum 14 with respect to the pivot point 19.

With the construction just described wherein there is coordinated movement between the carriages 2, 4 and 5, and the tool 12 in different directions and given ratios, one to the other, movement of the carriage 4, which carries a tracer for following the outline of a pattern on the model table 3, either forwardly or backwardly or to the left or right produces a corresponding movement of the carriages 2 and 5 and the tool 12 in a predetermined ratio to the movement of the carriage 4. This is due to the lever arm and segment connections previously described, and such ratio of movement between the tracer and tool will remain constant throughout the entire pattern tracing unless motion of the carriages is stopped and the throw of the connecting lever arms between the carriages is manually changed. It will be understood that the throw of the lever 6 determines the distance the carriage 5 moves to right or left when the carriage 4 is moved to right or left and this determines the length of a pattern cut from the model, while the throw of the lever 13 determines the ratio of movement between the carriage 2 and the tool 12 forwardly and backwardly and this determines the ratio of width between the model pattern and the pattern cut therefrom.

The tool 12 is of the usual construction having a reciprocating punch, not shown in detail in the drawings, which is positioned to reciprocate through the plane of a work piece of pattern material 20 and acts to reproduce the model 21 from the pattern material. The pattern material 20 is carried by suitable rolls and is secured in the main frame by means of a clamping device 22 during the production of the pattern (Fig. 1).

The carriage 4 is provided with a tracer 23 (see Figs. 2, 3 and 4) which is manually moved about the periphery of the pattern 21 by the operator through movement of the carriage 4. The motion of the tracer 23 and consequently the carriage 4, as determined by the shape of the model 21, is transferred to the tool 12 which reproduces a pattern whose length and width are graded in direct proportion to the adjustment of the pantographic devices including the levers 9 and 16 and their cooperating levers 6 and 13. The elements of the machine thus far described are or may be of usual construction and constitute the conventional basis of the present invention. For this reason it is deemed unnecessary to further describe the details of the mechanism usually found upon a grading machine of this type.

From the foregoing descritpion, it will be understood that the pattern grading mechanism so far described is capable of producing a pantographic pattern, or a number of patterns, from a given model, increasing the width and length of the patterns a predetermined amount to produce a series of sizes, say from a 4B to a 10B, the ratio of movement between the tracer 23 and the tool 12 being manually adjusted for each pattern size to be produced by properly positioning the blocks 7 and 14 in the segments 8 and 15 to obtain the desired throw of the lever arms 6 and 13 and co-ordinated movement of the carriage 5 and tool 12 with the carriages 2 and 4. The machine having been set to produce a given size pattern from the model size, the carriage 4 is moved to cause the tracer pin 23 to follow around the entire outline of the model pattern, this resulting in a corresponding movement of the tool 12 through the material, from which a pattern is to be cut, in a predetermined ratio to ultimately produce a pattern of the correct width and length of a known pattern size, say, for example, a 7B size pattern which is longer and wider than the model 4B pattern.

Movement of the tracer pin continuously about the model pattern, with the mechanism adjusted to have the cutter produce a pattern which is wider and longer than the model pattern, but of identically the same contour, will produce a pattern having the correct relation as to the length of the fore and back parts providing the fore and back parts of the model pattern have what may be termed an ideal ratio between the length of the fore and back parts, say a ratio of 2 to 1, which is compatible with the synchronized ratio movement of the tracer pin and tool, and produce a correct pattern of a different size than that of the model pattern. However, considering a pattern wherein the length ratio between the fore and back parts is not in the ideal ratio of 2 to 1, and that the fore and back parts of size patterns produced from the model pattern have dimensions which are in direct proportion to the over-all length of the model pattern, it will be readily seen that size patterns produced from the model pattern will not have the same length ratio between the fore and back parts as that of the model pattern. As a specific example, consider a model pattern having a standard back part but having a fore or style part which is of greater length than a pattern whose fore part length is in ideal ratio with the standard length of the back part, and which will synchronize with the ratio movement of the machine parts to maintain this same ideal length ratio between the fore and back parts in all sizes of patterns produced from the model size, and which model pattern thus has a greater over all length than that of the ideal pattern. With continuous movement of the tracer pin about the model pattern, other sizes of patterns may be produced by the cutting tool but such patterns will have the over all length distributed evenly between the fore and the back part instead of having the length of the back part increased in length the standard amount necessary from one size to another. That is, the back part length will be less than necessary for the standard size change. Since it is desirable to have the pattern back parts of the same size lengths regardless of the length of the fore or style part, this condition is untenable. It is true that the desired ratio of length between the fore and back parts of different sized patterns produced from a model pattern on this type of grading mechanism may be obtained by moving the tracer pin about a portion of the model pattern which is to be changed only a predetermined amount and cutting only that much of a pattern in one ratio, then stopping the operation of the apparatus and manually adjusting the ratio of movement between the tracer pin and the cutting tool so as to produce a different ratio of movement between the tracer pin and the tool for cutting the remainder of the pattern. However, this is objectionable by reason of loss of time and for the further reason that the produced pattern will be uneven at the point where the change in the ratio of movement between the tracer pin and the cutting tool was made.

The model 21, shown, is a pattern for a last bottom and is secured with its longitudinal axis parallel to the direction of movement of the carriage 4 upon the carriage 2 and is secured to the table 3 by means of the bolts 24. In accordance with this invention, the table 3 instead of being fixed is movable linearly in a direction parallel to the longitudinal axis of the pattern shown, the position in which the pattern is secured upon the table 3 being determined by the character of the pattern. The table 3 is guided within the main frame 1 and is supported by the bearings 26 which are supported in the main frame 1 (Fig. 6). The table 3 is held down against the bearings 26 and is prevented from lateral movement by the bearings 27 which are supported upon the frame 1 at the correct angle to engage with the angular side faces 28 of the table. Thus, the pattern 21 may move with the tracer pin 23 to the right or left as shown in Fig. 2, and for a purpose hereinafter apparent.

Movement may be imparted to the table 3 by a component of the movement of the carriage 4 through the medium of mechanism which includes an abutment in the form of a depending pin 29 adjustably secured in a bracket 31 which in turn is secured to the carriage 4. The pin 29 is adjustable within a slot 30 parallel to the longitudinal axis of the model table 3 and is secured in adjusted position by means of the nut 32 upon the upper end of the pin. The pin 29 is situated in such position that it engages the outer end of an arm 33 which in turn is rigidly secured at its other end to a rotatable vertical shaft 34 journaled in a bracket 35 rigidly secured to the main frame 1. Such shaft 34 has secured to the lower end thereof a segment 36 which rotates with the arm 33. The segment 36 has formed in its lower face an arcuate dovetailed groove 37 extending along its length and within which is received a pivot block 38 which is adjustable along such dovetail groove. The block 38 has formed in its lower face another dovetailed groove 39 (Fig. 7) within which is received a block 40 to which is pivotally secured one end of a link 41, the other end of the link 41 being pivotally secured to an arm 42. The radius of the arcuate dovetailed groove 37 is equal to the length of the link 41 between the axes of its pivot points, and the segment 36 is positioned upon the arc of a circle struck from the axis of the pivotal connection between the link 41 and the arm 42. The pivot block 38 may therefore be adjusted along the dovetailed groove 37 without imparting linear motion to the axis of the pivot point between the link 41 and the arm 42. The block 40 (see Fig. 7) is normally secured to and maintained in a fixed position in the groove 39. The axis of the pivot point between the link 41 and the block 40 is positioned on the arc of a circle coinciding with the radius of the groove 37 and passing through the axis of the shaft 34.

Such arm 42 is secured at its end opposite its connection with the link 41 to a rotatable shaft 43 which is journaled in a bracket 44 rigidly secured to a cross bar of the frame 1. The upper end of the shaft 43 has secured thereto a segment 46 having a dovetailed arcuate groove 47 formed in its upper face, (see Fig. 5) a pivot block 48 being disposed in the groove 47 and being adjustable along the length of the groove, and the pivot block 48 being secured in adjusted position along the groove by means of the hand nut 49. One end of a link 50 is pivotally secured to the block 48, the axis of the pivotal point being placed upon the arc of a circle drawn through the axis of the shaft 43. The groove 47 has a radius equal to the length of the link 50 between the axis of its pivotal connection with the block 48 and the axis of a pivotal connection with a bracket 51. Such bracket 51 is secured to the table 3 by means of the screws 52 (see Figs. 3 and 4). The segment 46 is so positioned with respect to the axis of the pivot between the link 50 and the bracket 51 that movement of the block 48 within the groove 47 will transmit no linear motion to the table 3.

With the mechanism just described, the pattern carrying table 3 may be moved at a predetermined speed simultaneously with movement of the carriage 4 and associated parts including the carriages 2 and 5 and the tool 12, the table 4 being moved to carry the tracer pin 23 about the model pattern 21. Thus, the length of the pattern produced by the tool 12 may be varied. That is, with the mechanism properly set, the tracer pin 23 will pick up the arm 33 at a preselected point in travel of the tracer pin along the model pattern and, through the medium of the arm 33, segment 36, arm 41, segment 46 and arm 50, move the pattern carrying table 3 in a predetermined speed ratio relative to movement of the carriage 4 and tracer pin 23 carried thereby.

A remote control device is provided for convenience of the operator in adjusting the pivot block 38 within the dovetailed groove 37 from his position in front of the model table 3 for varying the speed and extent of movement of the table 3 relative to the carriage 4. Referring to Figs. 3 and 4, the remote control comprises a rack 53 formed upon one of the side faces of the arcuate segment 36. A pinion gear 54 meshes with the rack 53 and is secured upon the upper end of a shaft 55 journaled in a frame 56 (see Fig. 4) which is rigidly secured to the pivot block 38. The lower end of the shaft 55 has secured thereto one of a pair of meshing beveled gears 57, the other gear of which is fastened to a shaft 58 also journaled in the frame 56. Such shaft 58 has secured thereto one end of a universal joint 59, the other end of which has secured thereto a shaft 60 extending toward the front of the machine and projects through an aperture 61 in the main frame 1, and which projecting end of the shaft 60 has secured thereto a hand wheel 62 in a convenient position to be grasped by the operator.

To move the block 38 in the groove 37 the operator rotates the hand wheel 62 which rotates the shaft 55 having the pinion 54 thereon through the bevel gears 57. By reason of the intermeshing of the gear 54 and the rack 53, the frame 56 and, consequently, the block 38 is moved relatively to and along the length of the segment 36, the position of the block 38 along the segment 36 being observed by the operator by noting the position of a pointer fixed to the block and moving over a scale 63 formed on the front face of the segment 36. The scale 63 may be calibrated in desired units to indicate movement of the table 3 for producing size patterns.

To enable the operator to readily position the pointer upon the indication marks of the scale 63, a plurality of depressions 64 (see Fig. 7) are formed in the horizontal wall 65 of the dovetailed groove 37. These depressions 64 are spaced (see Fig. 12) to correspond with the indication marks on the scale 63. A chamber 66 (see Fig. 7) is formed in the block 38 within which is received a spring 67 which is seated at one end upon the bottom wall of the chamber 66 and bears at its other end upon a steel ball 68, the steel ball 68 being positioned to enter the depressions 64 as the block 38 is moved along the groove 37. Thus, the operator in adjusting the block 38 may readily determine when the pointer 62 is exactly upon the indication marks on the scale 63 by the resistance to rotation of the hand wheel 62. To further vary the speed and extent of movement of the pattern table 3 relative to the movement of the table 4, the position of the block 48 in the segment 46 may be easily adjusted, it being adjacent the operator.

In grading a series of patterns from a model which may be a 4B, certain adjustments must be made in grading patterns from the model of different width sizes. For instance, the length of a B width pattern differs from the length of an A, AA, or AAA pattern in the same model. This increase or decrease in length of different width patterns and the making of the adjustment to procure this length change in size patterns produced is facilitated in the present invention by moving the block 40 within the dovetailed groove 39 (see Fig. 7) which accomplishes this change in pattern length independently of adjustment of the block 38 in the groove 37 for different sizes of patterns. The degree of such movement must be accurately determined since such increase or decrease is the same for each pattern of one size width over a pattern of another size width and the increments of such adjustment are marked upon a scale 69 upon the front face of the block 40 (see Fig. 8). To observe the position of the block 40 within the groove 39 in the block 38, a pointer 70 is secured to the link 41 in position to traverse the scale 69.

The degree of motion of the table 3 is further determined by the position of the block 48 in the groove 47 with respect to the axis of the shaft 43. To enable the operator to accurately adjust the attachment to produce a desired degree of motion in the table 3, a calibrated scale 71 is formed upon the face 72 of the segment 46 (see Fig. 11). To readily check the position of the block 48, a pointer is secured thereto in position to traverse the scale 71.

To illustrate the principles of the function of the invention a discussion will be made of the usual procedure and the manner in which the practice of the present invention varies therefrom. In the grading machine shown and described herein the width and length pantographic mechanisms are adjusted to obtain the change necessary in the grading factor to produce the desired sizes in the patterns produced thereby. The grading factor referred to is the constant or increment of length which the pantographs introduce in proportioning the patterns according to the desired size. Furthermore, the pantographs amplify or reduce each part of the model in direct proportion.

To enable these size adjustments to be made accurately a definite initial position of the tracer carriage must be determined and the carriage moved into this position when each change of adjustment is made. To locate this initial position which will hereinafter be called the reference position, an adjustable gauge member is located upon the main frame. This reference position must be established by, and is directly related to, the over-all length and maximum width of the model to be graded.

As has been usual in grading mechanisms as here shown, a shoulder 73 is formed on the tracer carriage 4 which has thereon a stop face 73X (see Fig. 2). Another stop face 74 is formed on the carriage 2. These faces coact with a gauge on the frame to determine the correct position of the carriages with respect to the length and width of the model pattern on the table 3. The gauge member which coacts with the stop faces 73X and 74 includes a rod 76 slidably adjustable in a block 77. This rod 76 has a collar 78 thereon movable with the rod, this collar having a shoulder 78X, and to set the gauge rod 76 the model to be graded is placed between a shoulder 79 on the block 77, the rod 76 being then moved until the model is calipered between the shoulder 79 and the shoulder 78X.

The inner end of the rod 76 projects inwardly beyond the body portion of the gauge member and the position of its inner end determines the longitudinal component of the reference position of the carriage 4 when the face 73X is moved into contact therewith. The rod 76 is held in its adjusted position by means of the set screw 80.

The model pattern is then placed between the block 77 on the gauge member and a shoulder 82 on the frame along a gauge rod 77X. The block 77 is adjustable at right angles to the adjustment of the rod 76 which permits the maximum width of the model to be calipered. This adjustment properly positions the block 77 which positions the rod 76 to act as stop member against which the stop face 74 contacts to determine the correct position of the lateral component of the reference position of the carriage 4. After this adjustment has been made, the distance between the block 77 and the shoulder 82 is fixed by tightening the set screw 83. When the face 74 on the carriage 2 is moved into engagement with the rod 76 of the gauge member and the face 73X of the shoulder 73 into engagement with the inner end of the rod 76, the carriage 4 will then be in its correct reference position as to length and width for the particular model to be graded.

Inasmuch as the use of the present invention changes the direct proportional grading factor of the grading machine the above described procedure for establishing the initial reference position of the carriage 4 is modified. This modification of the initial reference position is due to the fact that the grading of the model is not determined by the over-all length thereof. A standard or theoretically correct grading factor is established for the back part of the last whereas the fore part of the model is graded according to a predetermined factor which is a combination of the standard grading factor and another factor which is determined by the style contour of the fore part. For purposes of illustration, let it be assumed that a model is available that has a fore part and a heel part so proportioned that other patterns may be graded without manual change in the ratio of movement of the tracer and cutter during the grading operation, and produce correct patterns in all sizes. This model would have an over-all length dimension which will serve as a standard from which may be determined the length characteristic of the reference position of the carriage 4 in the special case when the attachment herein described is used. This over-all dimension will vary slightly depending upon the practice of the independent last manufacturer, but a size 4B would be approximately 9¾ or 10 inches. Adopting the 10 inch length, therefore, the distance between the shoulder 78X and the shoulder 79 is adjusted by means of a scale exactly 10 inches. The width characteristic of the reference position of the carriage 4 is determined in the manner already described since no modification in width grading is desired.

Let it be assumed, now, that a size 4 model is to be graded which is considerably longer than a model of 10 inch length. If no change were made in the length grading factors of the machine, the patterns produced would not be satisfactory in view of the fact that the back part will be graded in proportion to the over-all length of the model, and it will be too short to satisfy the standard requirement for correct fit. It is possible, however, by properly adjusting the attachment to maintain the correct length of the back part in each of the sizes required and to maintain the desired length and style contour of the fore part.

The usual method of securing the model to the model table is to bolt it securely in place with its longitudinal axis extending at right angles with a line drawn from front to back of the machine as shown in Figs. 2 and 3. Its position upon the table along its longitudinal axis is obtained by adjusting it until the extremity of the heel registers with a mark on the table. It is desirable to so locate the model upon the table with reference to the back part for the reason that the grading to be done in the present case bears a definite relation to the back part, whereas the correcting factor introduced by the present invention is more or less variable and relates to the fore part.

Desirably, a transverse line 84 (see Fig. 9) is drawn upon the model approximately at the central point of the ball section of the model at the point of maximum width thereof. The purpose of this transverse line is to definitely determine the point at which the change of grading factor between the pattern back and fore parts takes place. The pin 29 is now positioned in its slot 30 so that it will engage the arm 33 when the tracer pin 23 is at the line 84 in its travel about the model pattern. To locate this position, the tracer is moved along the model to a point upon the transverse line 84. The pin 29 is then adjusted in its slot 30 until it contacts with the side face 85 of the arm 33, and the lock nut 32 upon the upper end of the pin 29 is tightened to maintain the adjustment of the pin in the slot 30.

The position of the segment 36 relative to the pivot point between the arm 41 and arm 42 is determined by an adjustable stop member 86 which is slidably received in a bracket 87 secured to the main frame 1. The position of the rod 86 within the bracket 87 is fixed by the set screw 88 in the bracket 87. The inner end of the rod 86 engages the arm 33 and limits its motion toward the heel end of the pattern such motion being imparted by a spring 89 secured at one end to the arm and at its other end to an adjustable collar 90 upon the stop member 86 (see Figs. 1, 2 and 3). The position of the stop member 86 is so adjusted so that the segment 36 is held in a position wherein the arm 41 forms a perfect radius of the segment whereby the block 40 may be moved to any position in the groove 39 without producing any movement of the pattern carrying table 3, it being understood that the segment 36 rotates on the shaft 34. The reason this condition must be fulfilled is that when an adjustment for size is made through moving the segment 36 by rotating the hand wheel 62, the position of the model table 3 must not be varied. To change the point in the travel of the tracer carriage at which the pin 29 engages with and disengages from the arm 33 the pin 29 is readjusted in its slot 30.

For certain types of patterns other than last bottom patterns or sole patterns it may be necessary to initiate the change in grading factor at some point other than at the ball section of the model. In such cases it is necessary to provide for more latitude of adjustment than is provided by the movement of the pin 29 in its slot 30. To accomplish this added range of adjustment the construction of the stop member and the method of securing the arm 33 to the segment 36 may be varied as shown in Figs. 12 and 14, wherein the initial position of the segment 36 is determined by a stop member 91 which takes the form of a block 92 secured to the main frame 1 in position to engage the concave face 93 of the segment. A set screw 94 is provided having screw threaded engagement with the block 92 and provided with a lock nut 95 to secure it in adjusted position, the set screw 94 being so positioned that its head engages with the segment 36 and the adjustment of the screw determining the position of the segment. A spring 96 is secured at one end to the segment and its other end to the frame 1 and acts to hold the segment 36 in engagement with the set screw 94.

To gain more latitude of adjustment than is provided by the pin slot 30, the arm 33 is in this construction freely rotatable with respect to the shaft 34, having its inner end movable relative to an arcuate slot 97 in a segment 97' which is fixed to the shaft 34. The slot 97 is concentric with the axis of the shaft 34 and receives a bolt 98 which passes through the arm 33 and serves to clamp the segment 97 to the arm 33. By loosening the bolt 98, the arm 33 may be adjusted into such position that its outer end will engage with the pin 29 when the tracer is at any selected point along the length of the model, and when the desired position is ascertained the bolt 98 is tightened to secure the arm 33 rigidly to the segment 97'. During the adjustment of the position of the arm 33 with respect to the segment, the segment remains in its correct initial position as above pointed out. Thus, two means are provided for adjusting the position relative to the pattern at which the pin 29 picks up or leaves the arm 33, the arm 33 leaving the pin 29 when the arm 33 is returned against the stop 86 in Figs. 1, 2 3, and 4, or when the segment 36 is returned against the abutment 91 as shown in Fig. 12.

Thus far, in describing the construction and operation of the attachment, it has been assumed that the point at which the change of grade is initiated and the point at which the change of grade ceases during the tracing operation are substantially opposite along a transverse line drawn through the model. Obviously, a case may arise wherein it is desired to initiate the change of grade at one point in the length of the pattern and discontinue the change of grade at a different point in the length of the pattern. One method of accomplishing this result is illustrated in Fig. 13. In this construction the outer end of the arm 33 is provided with an adjustable cam member 99. The cam 99 may have a face 100 which is shaped to accomplish any special purpose. A convenient form for such a cam is one which has an angularly disposed face and is adjustably secured to the outer end of the arm 33 by any suitable means such as a pair of screws 101. The arm 33 in this construction is shortened the necessary amount, and the inner end of the cam member 99 desirably is provided with longitudinal slots 102 and transverse slots 103 within which the screws 101 are received, and the position of the cam along the length of the arm 33 and also its angular position upon the arm being therefore adjustable by reason of the slots in the cam. By properly adjusting the position of the cam 99, therefore, the point at which the change of grade along one side of the model is initiated and the point at which the change is discontinued when returning along the opposite side of the model is determined.

The adjustment to obtain the necessary degree of correction will now be described. During the production of the patterns as the tracer is moved about the fore part of the model, the longitudinal motion of the carriage 4 is transmitted to the arm 33 by the pin 29. After the tracer has completely traversed the fore part and returned to the transverse line 84 at a point opposite to the point where the pin 29 picked up the arm 33, the pin will then disengage from the arm 33 and the attachment ceases to function throughout the travel of the tracer about the heel part.

If the block 38 be adjusted to a position where the axis of its pivotal connection with the link 41 coincides with the axis of the shaft 34, any movement of the arm 33 and the segment 36 will transmit no motion to the link 41. Consequently, the table 3 remains motionless and no change in grading factor takes place. When producing a pattern the same size as the model, namely the 4B size, the block 38 is moved into this neutral position which is marked 0 on the scale 63. The divisions on the scale 63 are arbitrarily marked to indicate size divisions starting at 0 for the 4 size and running to 8 in the larger sizes and from 0 to 4 in the opposite direction for the smaller sizes. The actual size numbers differ from the scale numbers by 4 since 0 on the scale produces a 4 size pattern. Inasmuch as the model is always made to produce a properly fitting shoe, its duplicate in a pattern requires no modification. It is only in the larger sizes and those sizes smaller than the model size that modification is required. The divisions on the scale 63 are calculated properly to distribute the required maximum dimension of the modification of the model throughout the complete range of sizes.

The degree of motion of the table 3 which may be called the correction factor to be used in connection with a particular model must be under the control of the operator. This correction factor is also determined by the designer of the last or other article being produced and the block 48 is adjusted in the slot 47 to obtain this correction. After such adjustment the block is locked in position by tightening the hand nut 49. A convenient method of applying the correction factor to the attachment is to determine the maximum dimension of the modification necessary in a given model and adjust the block 48 to move the table 3 this amount and at the correct speed when the largest size in the series is being graded, such, for instance, as the 10 size, at which time the block 38 will be moved into its position where the pointer indicates 6 on the scale 63. As will be apparent from the foregoing description, this correction factor is incorporated in the pattern produced by the bodily motion of the table 3 and consequently the model clamped thereon. Since the table moves as the tracer is moved about the fore part, the tracer is caused to have the motion of the table added to the length of the model when such motion is in the direction of the toe. When the direction of motion of the table is toward the heel, such motion is subtracted from the length of the model.

To give motion to the table 3 in the direction of the toe, the block 48 is adjusted forwardly or toward the operating position from the axis of the shaft 43. To cause the table to move toward the heel, the block 48 is adjusted rearwardly of the axis of the shaft 43.

While a specific form of mechanism is herein illustrated and described to effect the change in the constant or increment of length added to or subtracted from the model size by the pantographs, it will be understood that other means may be employed to accomplish the same result. For instance, other means than the movement of the model table relatively to the frame may be employed and, furthermore, other means than that described may be employed for transmitting and adjusting the degree of motion necessary to effect the correction or change desired.

To graphically illustrate the correction in the pattern, reference may be made to Fig. 9 of the drawings. The particular model illustrated has an abnormally short fore part which, if graded in direct proportion upon a pattern grading machine, would result in producing patterns having their heel part graded disproportionately to that which is required to produce a properly fitting shoe. The full lines illustrate the outline of a corrected pattern for the bottom of a last while the dotted lines illustrate the contour of a pattern produced without the use of the attachment. It will be noted that the change has taken place in the corrected model at and adjacent to the ball section only. The general contour of the rear portion of the heel part, that of the fore part, and the length of the two patterns are the same in each of the patterns.

Another way of stating the corrective action is as follows: The outline of the section of the model extending from the transverse line 84 rearwardly to the point of minimum width at the instep is moved backward toward the heel the necessary amount to insure correct fit and, at the same time, the desired contour of the fore part and the correct over-all length of the pattern are retained.

The necessary course of procedure which the operator must follow in producing a series of corrected patterns will now be pointed out. The block 48 is first adjusted along the segment 46 in the manner above pointed out thereby to establish the predetermined correction factor. The hand wheel 62 is then rotated until the pointer on the scale 63 indicates 0. The model size may now be produced which is a convenient starting point in the production of a series. The necessary adjustments on the standard length and width grading mechanisms is then made in the usual way for the next size or half size larger. The hand wheel 62 is again rotated until the pointer on the scale 63 indicates the corresponding size. The tracer is then moved about the periphery of the model to produce the next larger size. Each succeeding size is then produced by repeating the operations above set forth. For each change of size the hand wheel 62 is rotated to move the block 48 into the respective size position as indicated by the pointer on the scale 63.

The method of correcting shoe patterns above set forth is only one of the uses for the attachment. The attachment may be employed to bring about various modifications of a particular model which, while it may fulfill the requirements for a perfect fit in the model size, may, due to its peculiar form, require that certain modifications be made in some or all of its elements in the patterns produced therefrom.

In designing a last to be used as a model in a last lathe from a standard model pattern, the heel part must be lengthened a fixed amount to provide for the material removed by the saw cut made at the joint between the fore and heel parts in the construction of the lasts produced upon the lathe. In many cases also it is desirable to add a slight amount to the last produced in a last lathe to provide for the sanding and smoothing operations at the heel and toe extremities of the last which tend to shorten the finished last a slight amount. The attachment may be brought into use automatically to make these necessary corrections to maintain the correct fit in the last and also to maintain the required contour of the fore part and the correct over-all length in each size.

To accomplish the modification of a pattern necessary to produce a model last as above set forth, the following steps are followed by the operator in preparing the grading machine. The operator adjusts the length pantographic mechanism to produce a pattern whose over-all length is greater than the unmodified pattern by an amount equal to the added correction plus the amount which the fore part is enlarged by the pantograph. Assuming it is desired to add $\frac{1}{16}''$ to the heel part and the ratio between the length of the fore part and the heel part are as 1 to 2, then ½ of $\frac{1}{16}$ or $\frac{1}{32}$ is added to the $\frac{1}{16}''$ increment. The operator then makes adjustment on the attachment to shorten the fore part an amount sufficient to produce the original or normal length in the fore part which in this case is $\frac{1}{32}''$. The resulting pattern will then be $\frac{1}{16}''$ long in the heel part and all of the dimensions of its fore part will be the same as the unaltered pattern.

Such a corrected pattern is shown in Fig. 10 in which the full line indicates a pattern which has been corrected and from which a last may be made to be used as a model in a last lathe. The dotted line in this figure represents the unaltered pattern and illustrates the degree which the heel part has been lengthened and that the remainder of the corrected pattern is identical with the unaltered pattern. To make this correction the block 40 may be adjusted in its slot 39 such adjustment being locked throughout the production of a series of patterns.

The adjustment of the block 40 within the block 38 may be used to produce another necessary correction. In the designing of last bottom patterns, it is necessary to take into consideration a slight change in the over-all length in different widths. For instance, the narrow widths such as the A, AA or AAA widths are slightly shorter than the B width while in widths wider than the B width, for instance, the C, D, and E widths, the length of the patterns must be increased.

As hereinbefore pointed out, it is highly desirable to maintain the heel part a standard length in each pattern size and in the present instance this also holds true. The amount added to or subtracted from the patterns therefore must be done in the fore part only since the length of the heel part should not vary from the standard requirement. This correction has heretofore been accomplished manually by the operator. The heel part is traced while the adjustments on the pantographic mechanism are set to amplify or reduce the heel part in correct proportion. Before tracing the fore part the operator stops the machine and readjusts the length pantographic mechanism to shorten or lengthen the fore part the necessary amount depending upon whether the size produced is larger or smaller than the B or model size. Upon completion of the tracing operation about the fore part, the operator must again reset the pantographic mechanism to the initial adjustment.

When using the attachment the pantographic mechanism is adjusted to produce a correct back part in the same manner as that above described in the manual procedure. The attachment is adjusted to increase or decrease the length of the fore part the required amount. The operator then completes a tracing operation in one uninterrupted movement and the correction in the length of the fore part is effected automatically in the same manner as that described in connection with the correction of errors in fit resulting from style changes in the fore part.

The present correction is accomplished preferably by adjustment of the block 40 within the block 38. When the block 40 has been moved along the dovetailed groove 39 the required amount it is fixed in this position and remains in this position throughout the grading of a complete series of patterns.

It will be understood in every instance when the block 40 is adjusted that the position of the block 48 in segment 46 must be taken into consideration because the extent of motion of the model table is directly dependent thereon.

It will be obvious from the above detailed description of certain specific uses for the attachment that its use may be extended to effect many changes in shoe patterns or patterns for other purposes. Any portion of the model may be lengthened or shortened irrespectively of the other portions of the model and furthermore, the attachment may be used to produce a pattern or similar article whose over-all length will conform to a predetermined specification and wherein the proportion of the lengths of the component parts thereof may vary from that of the model. All of the above changes which deviate from the dimensions of the model are made without deviating from the general contour of the outline of the model.

An important feature of the function of the attachment relates to the manner in which the correction in the increment of length added by the standard pantograph takes place. This correction is not introduced all at one time but is distributed throughout the length of the portion of the model in which the correction or change is made. As a result of this gradual application of the correction or change in the model, the contour of a changed or corrected object retains the appearance of the model. This gradual action of the attachment in bringing about the desired result is necessary since if the whole change or correction were made at a certain point in the grading process, the contour of the resulting product would not be satisfactory. In many instances, such an attempted method of correction would result in a portion of the outline of the product produced being irregular and such a pattern or last could not be adapted to any commercial use. The action of the attachment is in itself pantographic since the change brought about thereby is in proportion to the motion of the tracer carriage.

Having thus described the invention, I claim:

1. A model copying machine comprising means for holding the model, means for holding the work piece, a tracer for engaging the model, a tool for reproducing the model from the work piece, pantographic means for amplifying or reducing the length of a portion of the model according to a predetermined requirement and means acting automatically to change the amplification or reduction of the remainder of the model to fulfill a different predetermined requirement.

2. A model copying machine comprising a frame, means for holding the model, means for holding the work piece, a tracer for engaging the model, a tool for reproducing the model in the work piece, means for amplifying the length of a portion of the model according to a predetermined requirement and means acting automatically by movement of said model holding means relatively to the frame to change the amplification of the remainder of the model to fulfil a different predetermined requirement.

3. A model copying machine comprising a frame, means for holding the model movable rectilinearly in said frame, means for holding a work piece, a tracer for engaging the model, a tool for reproducing the model, pantographic means for amplifying the over-all length of the model according to a standard requirement and means acting automatically to vary the length of the component parts of the model by movement of said model holding means according to a predetermined requirement differing from said standard requirement, said means acting to maintain the sum of the lengths of said component parts equal to said standard over-all length.

4. A model copying machine comprising a main frame, means for holding the model, means for holding the work piece, a tracer for engaging the model, a tool for reproducing the model in the work piece, length pantographic grading means, means to adjust the said pantographic means to add to or subtract from the model length a predetermined increment of length, means acting automatically throughout a selected portion of the linear movement of said tracer along the length of said model to change said increment of length, and means for adjusting the degree of change in said increment of length whereby the over-all length of the product may be made to fulfill an additional requirement.

5. A grading machine comprising a main frame, a rectilinearly movable model table, a tracer carriage having a tracer thereon, means for holding pattern stock in said main frame, a tool for reproducing a model secured to said table from said pattern stock, pantographic means connecting said tracer carriage and said tool adjustable for grading a series of patterns from said model, an arm pivoted on said main frame, a stop for limiting the motion of said arm in one direction, a shoulder on said tracer carriage adjustable to engage with said arm at a determined point in the longitudinal travel of said tracer carriage, adjustable means for transmitting the motion of said lever to said model table whereby the increment of length added by the grading means may be altered a predetermined degree thereby to produce a series of patterns having a back part whose dimensions produce a correctly fitted back part, whose fore part conforms to the contour of the model and the sum of the lengths of the fore and back parts equal the required over-all length.

6. A grading machine comprising a main frame, a model holding table rectilinearly movable in said main frame, a manually operable carriage having a tracer thereon to be moved about the periphery of a model secured to said table, a pattern stock holder, a tool acting to reproduce the model from stock held in said stock holder, pantographic grading means for grading length and width of patterns, means acting to transmit motion of said tracer carriage to said model holding table during a portion of the longitudinal motion of the carriage parallel to the motion of said table thereby to change the grading factor of that pantographic mechanism responsive to such motion thereby to produce a series of patterns having desired characteristics disproportionate to the model.

7. A model copying machine comprising a main frame, a table for holding a model movable rectilinearly in said main frame, means for holding the work piece, a tool for reproducing a model from the work piece, a tracer carriage having a tracer thereon for engaging the model and guiding the tool, a shoulder on said carriage, a bell crank lever pivoted in said main frame having one of its arms situated in the path of said shoulder on said carriage, a link connecting the other arm of said bell crank lever to one arm of a second bell crank lever, a link connecting the other arm of said second bell crank lever to said movable model table whereby the motion of said tracer carriage is transmitted to said table.

8. A model copying machine comprising a main frame, a table for holding a model movable rectilinearly in said frame, means for holding the work piece, a tool for reproducing the model from said work piece, a tracer carriage having a tracer thereon for engaging the model and guiding the tool, a shoulder on said carriage, a bell crank lever pivoted on said frame one arm of said lever being situated to be engaged and moved by said shoulder throughout a portion of the travel of the linear motion of said carriage, a link connected at one end to the other arm of said bell crank lever, means for shifting the point of connection of the said link and bell crank lever arm, another bell crank lever pivoted on said frame one arm of which is pivotally connected to the other end of said link, a second link pivotally connected at one end to the other arm of said second bell crank lever, and at its other end to said movable model holding table and means on said second bell crank lever to shift its point of connection with said second link.

9. A model copying machine comprising a main frame, a table for holding a model movable rectilinearly in said frame, means for holding a work piece, a tool for reproducing a model from said work piece, a tracer carriage having a tracer thereon for engaging the model and guiding the tool, a shoulder on said carriage, a bell crank lever pivoted on said frame one arm of said lever being situated to be engaged and moved by said shoulder throughout a portion of the travel of the linear motion of said carriage, a link pivotally connected to the other arm of said bell crank lever, adjusting means on said bell crank lever operable to shift the point of connection of the said link and said arm in an arcuate path having a radius equal to the length of said link and passing through the axis of the fulcrum of the lever, another bell crank lever one arm of which is pivotally connected to the other end of said link, a second link pivotally connected at one end to the other arm of said second bell crank lever and at its other end to said model holding means and means on said second bell crank level to shift its point of connection with said second link in an arcuate path having a radius equal to the length of said second link and passing through the axis of the fulcrum of said second lever.

10. A model copying machine comprising a frame, means for holding the model, means for holding a work piece, a tracer carriage having a tracer thereon for engaging the model, a tool for reproducing the model from said work piece, pantographic grading means for amplifying said model, an arm pivoted on said frame engaged by said tracer carriage and moved throughout a selected portion of the linear motion thereof, means connecting said arm and said model holding means acting to transmit motion from one to the other, a cam adjustably mounted on the outer end of said arm in position to be engaged by said tracer carriage and means for adjusting the angular position of said cam with relation to said arm and the position of said cam along the length of said arm whereby the point of contact of said tracer carriage when tracing one edge of said model and the point of disengagement with the tracer carriage when tracing the opposite edge of said model may be varied in accordance with a predetermined requirement.

11. The method of pantographically producing size patterns from a model pattern, wherein each size in the produced patterns embodies a constant over-all length change, comprising varying a pre-selected part of each produced pattern by a predetermined increment of the total over-all length change, and varying the remainder of each produced pattern by the remaining increment of the over-all length change.

12. The method of pantographically producing size patterns from a model pattern, wherein each size in the produced patterns embodies a constant over-all length change, and wherein the model pattern is made up of a fore part and a back part having a definite length ratio, comprising varying one of the parts of the produced pattern by a predetermined increment of the total over-all length change, and varying the remaining part of the reproduced pattern by the remaining increment of the total over-all length change without respect to the length ratio between the parts of the model pattern.

13. The method of pantographically producing size patterns from a model pattern, wherein each size in the produced pattern embodies a constant over-all length change, and wherein the model pattern is made up of a fore part and a back part having a definite length ratio, comprising varying the length of the back part of the produced size pattern by a predetermined increment of the total over-all length change, and varying the fore part of the reproduced pattern by the remaining increment of the total over-all length change.

14. The method of pantographically producing size patterns from a model pattern, wherein each size in the produced pattern embodies a constant over-all length change, and wherein the model pattern is made up of a fore part and a back part having a definite length ratio, comprising varying the length of the back part of the produced size pattern by a predetermined increment of the total over-all length change, and varying the fore part of the reproduced pattern by the remaining increment of the total over-all length change, without respect to the length ratio between the fore and back part of the model pattern.

15. The method of pantographically producing size patterns from a model pattern, wherein each size in the produced pattern embodies a constant over-all length change, and wherein the model pattern is made up of a fore part and a back part having a definite length ratio, comprising varying the length of the back part of the produced size pattern by a predetermined increment of the total over-all length change, and varying the fore part of the reproduced pattern by the remaining increment of the total over-all length change, without respect to the length ratio between the fore and back part of the model pattern, and whereby the length ratio between the fore and back part of each produced size pattern varies from that of all other produced patterns.

16. The method of pantographically producing size patterns from a model pattern, having a fore part and a back part, and wherein each size in the produced patterns embodies a constant over-all length change, comprising varying the size length of each produced pattern back part a predetermined increment of the total over-all length change, and varying the forepart of each produced pattern by the remaining increment of the over-all length change.

17. The method of pantographically producing size patterns from a model pattern including a fore part and a back part having a definite length ratio one to the other, and wherein each size change in the produced pattern embodies a constant over-all length variation, which comprises varying the produced pattern back part by a pre-selected increment of the total length change not bearing the same ratio to the remainder of the total length change that the back part of the model bears to the fore part thereof, and varying the fore parts of the produced patterns by such remainder of the total length change.

18. A pattern grading machine, comprising a model pattern support, a model follower, a work support and a cutter, interconnecting mechanism between said model follower and said cutter whereby the one moves in response to movement of the other to pantographically reproduce said model in said work, means for varying the over-all length of said produced patterns by a constant, and means for varying a pre-selected part of each produced pattern by a predetermined increment of the total over-all length change, and varying the remainder of each produced pattern by the remaining increment of such over-all length change.

19. A pattern grading machine for reproducing patterns from a model having a fore part and a back part, comprising a model pattern support, a model follower, a work support and a cutter, interconnecting mechanism between said model follower and said cutter whereby the one moves in response to movement of the other to pantographically reproduce said model pattern in said work, means for varying the over-all length of the produced patterns by a constant, and means for varying a pre-selected part of each produced pattern by a pre-determined increment of the total over-all length variation and varying the remainder of each produced pattern by the remaining increment of such over-all length variation irrespective of the amount of such last named increment.

20. A pattern grading machine for reproducing patterns from a model having a fore part and a back part which bear a definite length ratio one to the other, comprising a model pattern support, a model follower, a work support and a cutter, pantographic mechanism connecting said model follower and said cutter for reproducing said model pattern in said work, means for varying the over-all length of the reproduced patterns by a constant, and means for varying a pre-selected part of each reproduced pattern by a pre-determined increment of the total over-all length variation and varying the remaining part of each produced pattern by the remaining increment of the total over-all length variation irrespective of the length ratio between the fore and back parts of the model pattern.

GEORGE CLAUSING.